US011384655B2

(12) United States Patent
Davies

(10) Patent No.: US 11,384,655 B2
(45) Date of Patent: Jul. 12, 2022

(54) GAS TURBINE ENGINE ELECTRICAL GENERATOR

(71) Applicant: ROLLS-ROYCE plc, London (GB)

(72) Inventor: Paul R Davies, Derby (GB)

(73) Assignee: ROLLS-ROYCE PLC, London (GB)

(*) Notice: Subject to any disclaimer, the term of this patent is extended or adjusted under 35 U.S.C. 154(b) by 100 days.

(21) Appl. No.: 16/914,867

(22) Filed: Jun. 29, 2020

(65) Prior Publication Data

US 2021/0010382 A1 Jan. 14, 2021

(30) Foreign Application Priority Data

Jul. 12, 2019 (GB) ...................................... 1910008

(51) Int. Cl.
| | | |
|---|---|---|
| *F01D 15/10* | (2006.01) | |
| *F01D 19/00* | (2006.01) | |
| *F01D 25/16* | (2006.01) | |
| *F02C 6/04* | (2006.01) | |

(52) U.S. Cl.
CPC ............ *F01D 15/10* (2013.01); *F01D 19/00* (2013.01); *F01D 25/162* (2013.01); *F01D 25/166* (2013.01); *F02C 6/04* (2013.01)

(58) Field of Classification Search
CPC .......... F01D 15/10; F01D 19/00; F01D 25/16; F01D 25/162; F01D 25/166; F02C 6/04; F02C 7/32; F02K 5/00; F05D 2220/76; F05D 2240/50; F05D 2260/311
See application file for complete search history.

(56) References Cited

U.S. PATENT DOCUMENTS

| | | | |
|---|---|---|---|
| 4,531,357 A | 7/1985 | Weber et al. | |
| 6,817,431 B1 * | 11/2004 | Rasch | B60K 17/00 180/65.22 |
| 7,514,810 B2 * | 4/2009 | Kern | F02C 7/32 290/52 |
| 7,728,447 B2 * | 6/2010 | Becquerelle | H02K 11/042 310/67 R |
| 8,476,798 B2 * | 7/2013 | Dooley | H02K 7/1823 310/112 |

(Continued)

FOREIGN PATENT DOCUMENTS

| | | |
|---|---|---|
| DE | 10 2010 049 885 A1 | 5/2012 |
| DE | 102013209388 A1 | 11/2014 |

(Continued)

OTHER PUBLICATIONS

Dec. 8, 2020 Extended Search Report issued in European Patent Application No. 20180138.8.

(Continued)

*Primary Examiner* — Jesse S Bogue
(74) *Attorney, Agent, or Firm* — Oliff PLC

(57) ABSTRACT

An aircraft gas turbine engine (10) comprises a main engine shaft (22, 23), a main engine shaft bearing arrangement (36, 44, 49, 50) configured to rotatably support the main engine shaft (22, 23) and an electric machine (30) comprising a rotor (34) and a stator (32). The rotor (34) is mounted to the main engine shaft (22, 23) and is rotatably supported by the main engine shaft bearing arrangement (36, 44, 49, 50), and the stator (32) is mounted to static structure (46) of the gas turbine engine (10).

11 Claims, 8 Drawing Sheets

(56) References Cited

U.S. PATENT DOCUMENTS

| | | | | |
|---|---|---|---|---|
| 8,624,415 | B2* | 1/2014 | Koenig | F02K 3/06 |
| | | | | 290/52 |
| 2006/0138888 | A1* | 6/2006 | Bouiller | F01D 25/18 |
| | | | | 310/90 |
| 2008/0110151 | A1 | 5/2008 | Welch et al. | |
| 2008/0148881 | A1 | 6/2008 | Moniz et al. | |
| 2008/0166076 | A1 | 7/2008 | Stout et al. | |
| 2010/0000226 | A1 | 1/2010 | Rensch | |
| 2010/0327588 | A1 | 12/2010 | Macchia | |
| 2011/0154827 | A1 | 6/2011 | Ress, Jr. et al. | |
| 2013/0098179 | A1 | 4/2013 | Beier et al. | |
| 2014/0026700 | A1 | 1/2014 | Beier | |
| 2014/0306460 | A1* | 10/2014 | Donnelly | F02C 7/32 |
| | | | | 290/1 A |
| 2014/0328668 | A1* | 11/2014 | Anthony | F02C 7/36 |
| | | | | 415/10 |
| 2015/0311770 | A1 | 10/2015 | Goi et al. | |
| 2017/0141648 | A1 | 5/2017 | Chong et al. | |
| 2018/0051701 | A1* | 2/2018 | Kupiszewski | H02K 7/083 |
| 2018/0138767 | A1 | 5/2018 | Moore et al. | |
| 2018/0372004 | A1 | 12/2018 | Alstad et al. | |
| 2019/0048826 | A1 | 2/2019 | Pointon et al. | |
| 2019/0101057 | A1 | 4/2019 | Stevenson et al. | |
| 2019/0218978 | A1 | 7/2019 | Edwards et al. | |
| 2019/0316486 | A1 | 10/2019 | Roberge | |

FOREIGN PATENT DOCUMENTS

| | | |
|---|---|---|
| EP | 1939429 A2 | 7/2008 |
| EP | 3511549 A1 | 7/2019 |
| GB | 2 443 743 A | 5/2008 |
| GB | 2 550 397 A | 11/2017 |
| RU | 2168024 C2 | 5/2001 |

OTHER PUBLICATIONS

Dec. 8, 2020 Extended Search Report issued in European Patent Application No. 20180140.4.
Dec. 8, 2020 Extended Search Report issued in European Patent Application No. 20180139.6.
Dec. 8, 2020 Extended Search Report issued in European Patent Application No. 20180137.0.
U.S. Appl. No. 16/914,827, filed Jun. 29, 2020 in the name of Paul R. Davies.
U.S. Appl. No. 16/914,911, filed Jun. 29, 2020 in the name of Jonathan P. Bradley.
U.S. Appl. No. 16/915,032, filed Jun. 29, 2020 in the name of Jonathan P. Bradley.
Search Report of the Intellectual Property Office of the United Kingdom for GB1910010.6 with search date of Jan. 9, 2020.
Search Report of the Intellectual Property Office of the United Kingdom for GB1910011.4 with search date of Dec. 17, 2019.
Search Report of the Intellectual Property Office of the United Kingdom for GB1910008.0 with search date of Jan. 9, 2020.
Search Report of the Intellectual Property Office of the United Kingdom for GB1910009.8 with search date of Jan. 9, 2020.
Dec. 8, 2021 Notice of Allowance issued in U.S. Appl. No. 16/914,827.
Dec. 8, 2021 Notice of Allowance issued in U.S. Appl. No. 16/914,911.
Dec. 10, 2021 Notice of Allowance issued in U.S. Appl. No. 16/915,032.
Aug. 9, 2021 Office Action Issued in U.S. Appl. No. 16/915,032.
Sep. 17, 2021 Office Action issued in U.S. Appl. No. 16/915,032.
Aug. 18, 2021 Office Action issued in U.S. Appl. No. 16/914,827.

* cited by examiner

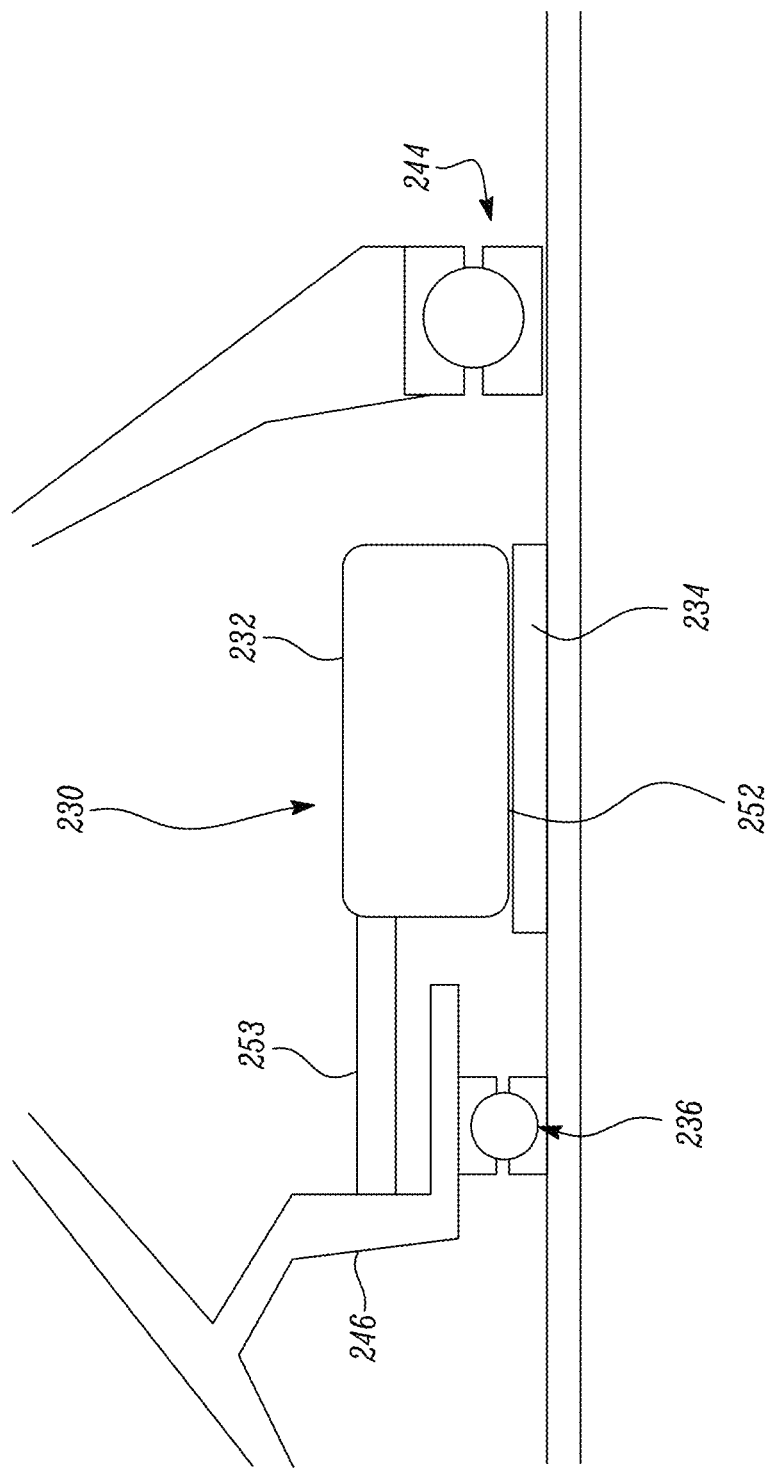

GAS TURBINE ENGINE ELECTRICAL GENERATOR

CROSS-REFERENCE TO RELATED APPLICATIONS

This application claims the benefit of United Kingdom Patent Application No. 1910008.0 filed on Jul. 12, 2019, the disclosure of which is herein incorporated by reference in its entirety.

TECHNICAL FIELD

The present disclosure relates to electric machines of gas turbine engines, and gas turbine engines comprising electrical machines.

BACKGROUND

Aircraft gas turbine engines provide both propulsive and electric power for aircraft. Consequently, such engines comprise electric machines such as generators for providing electric power. Further electric machines in the form of motors configured to drive fluid pumps such as oil and fuel pumps may also be provided. The function of the generators and motors can be combined, such that, for instance, a generator may operate as a starter motor during starting.

As electrical power demands increase, and electrical motors are increasingly used to replace hydraulic and pneumatic motors in aircraft, the size of electric machines on aircraft is steadily increasing relative to the size of the gas turbine engines. Consequently, packaging of such machines within the limited space available is becoming increasingly difficult.

A conventional packaging arrangement for an electric machine for a gas turbine engine is shown in FIG. 1. A gas turbine engine 1 comprises a main engine compressor shaft 2, which rotates when the engine is in operation. This is coupled to an offtake shaft 3 via bevel gears 4. The offtake shaft 3 is in turn coupled to an angle drive shaft 5 through a second set of bevel gears 6. Further gears such as spur gears may also optionally be included in the drive train. An electric machine 7 is coupled to the angle drive shaft 5. Such an arrangement is heavy, complex, and inefficient, in view of the gearing.

Alternative arrangements have also been proposed, including so-called "embedded generators", in which an electric machine is installed within an annular space radially inward of a compressor gas path, coaxially with the compressor. Such an arrangement provides for efficient packaging, but presents other difficulties.

The present invention seeks to provide an improved gas turbine engine having an embedded electric machine.

SUMMARY

According to a first aspect there is provided an aircraft gas turbine engine comprising: a main engine shaft; a main engine shaft bearing arrangement configured to rotatably support the main engine shaft; and an electric machine comprising a rotor and a stator; wherein the rotor is mounted to the main engine shaft and is rotatably supported by the main engine shaft bearing arrangement, and the stator is mounted to static structure of the gas turbine engine.

Consequently, the machine rotor is supported by the same bearings as the main engine shaft. Consequently, additional electric machine rotor bearings are not required, thereby reducing cost, weight and space requirements for the electrical machine. The arrangement also provides for additional advantages, as outlined below and in the detailed description.

The stator of the electric machine may be cantilevered from the static structure of the gas turbine engine. Consequently, the electric machine stator is mounted at one end only, with the opposite end being free-floating. In general, an axial forward or rearward end may be mounted, with the other of the axial rearward or forward end being free-floating. Consequently, a strong but flexible structure is provided to mount the stator, which allows for relative movement of the core engine casing in use, while maintaining a small and consistent clearance between the electric machine rotor and stator. On the other hand, if the stator were to be mounted at both ends, flexing of the engine static structure would result in flexing of the stator or its casing, which would result in large loads being applied to the stator, and/or inconsistent clearance between the rotor and stator.

The electric machine stator may be mounted by a mount member extending generally rearward from a gas turbine engine static structure. Alternatively, the machine stator may be mounted by a mount member extending generally forward from a gas turbine engine static structure. Advantageously, the electric machine stator mounting can be accessed from one axial end. Consequently, the electric machine stator can be removed and installed from the gas turbine engine without requiring access to both ends.

The main engine shaft may comprise a radially inner portion and a radially outer portion separated by an annular space, and joined at one end. The electric machine rotor may be mounted to the radially outer portion of the main engine shaft. Advantageously, some degree of flexibility may be provided for between the outer and inner portions of the engine shaft, which may allow for relative movement between the two, thereby ensuring minimal loads on the electric machine rotor due to vibration for example, and a consistent gap between the rotor and stator. Such an arrangement may also isolate torsional vibration from the electric machine rotor from the main engine shaft. Additionally, relative thermal expansion between the rotor and the main engine shaft to which the rotor is mounted is allowed for. Finally, by separating the two portions, the electric machine rotor shaft diameter can be set separately to the main engine shaft diameter, allowing for independent optimisation of these two parameters.

The radially inner and radially outer portions may be joined by a fusible connector. Advantageously, in the event of a failure of the electric machine, connection between the electric machine rotor and main engine shaft can be severed, thereby preventing damage to the gas turbine engine, and removing the need for an engine shut-down.

Alternatively, the electric machine rotor may be directly mounted to an external surface of the main engine shaft.

The main shaft bearing arrangement may comprise a first bearing and a second bearing. The first bearing may comprise a radial load bearing and the second bearing may comprise a thrust bearing.

The first bearing may be provided axially rearward of the electric machine rotor, and the second bearing may be provided axially forward of the electric machine rotor. Advantageously, the electric machine rotor is held rearward and forward, to minimise whirl in use, in order to maintain a minimal rotor-stator air gap in use, and to prevent contact between the rotor and stator.

The bearing arrangement may comprise one or more roller bearings, and may comprise one or more ball bearings.

The first or second bearing may comprise a double-row bearing. The double-row bearing may comprise a back-to-back bearing, in which the contact angles of each of the bearings of the double row bearing diverge inwardly. Advantageously, the bearing can carry thrust loads in both a forward and a reverse direction without skidding of the bearings in the event that the load is reversed.

The electric machine may comprise an electric motor configured to provide motive power to start the gas turbine engine in a starting mode, and may comprise a generator configured to generate electrical power when in a running mode.

The electric machine may comprise a radial flux electric machine. The stator may be provided radially outward or radially inward of the rotor.

The electric machine may comprise one of a permanent magnet electric machine and a switched reluctance electric machine. Permanent magnet machines have a high power density, and so enable still further reductions in weight, and increased packaging efficiency.

The main gas turbine engine shaft may be arranged to couple a turbine to a compressor to form a spool. The spool may further comprise one or more compressor or turbine drive arms, and may comprise one or more compressor or turbine discs. The drive arms may be configured to couple one or more discs to the shaft.

The gas turbine engine may comprise a high pressure spool comprising a high pressure compressor coupled to a high pressure turbine by a high pressure shaft.

The gas turbine engine may comprise a low pressure spool comprising a low pressure compressor coupled to a low pressure turbine by a low pressure shaft.

The electric machine rotor may be coupled to one of the high pressure shaft and the low pressure shaft, and may be coupled to the low pressure shaft via a reduction gearbox.

The low and high pressure shafts may be coaxial, and the low pressure shaft may be provided radially inward of the high pressure shaft along at least part of its length.

The gas turbine engine may comprise a fan coupled to a main engine spool.

The low pressure compressor may be located axially forwardly of the high pressure compressor.

The electric machine may be located forward of the high pressure compressor, and may be located rearward of the low pressure compressor.

Alternatively, the electric machine may be located axially forward of the low pressure compressor, or in a common axial plane with the low pressure compressor.

The electric machine stator may comprise a plurality of part circumferential machine stator segments comprising respective windings, which may be individually mounted to static structure of the gas turbine engine. Consequently, the electric machine stator can be removed from within the gas turbine engine core, without disassembling the whole engine.

Arrangements of the present disclosure may be particularly, although not exclusively, beneficial for fans that are driven via a gearbox. Accordingly, the gas turbine engine may comprise a gearbox that receives an input from one or more main engine shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The electric machine may be located axially between the gearbox and the low pressure compressor. Alternatively, the electric machine rotor may be mounted to one of the rotating components of the gearbox.

The gas turbine engine as described and/or claimed herein may have any suitable general architecture. For example, the gas turbine engine may have any desired number of shafts that connect turbines and compressors, for example one, two or three shafts.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

According to a second aspect of the invention, there is provided a method of assembling an embedded electric machine in a gas turbine engine, the method comprising: mounting a stator of the electric machine to a static structure of the gas turbine engine; then inserting a gas turbine engine main shaft comprising an electric machine rotor into an annular space defined by the electric machine stator; the gas turbine engine main shaft being supported by at least one main engine shaft bearing during insertion.

Advantageously, the electric machine can be assembled within the core of the gas turbine engine, whilst being supported by one or more main gas turbine engine bearings. The bearings can react forces generated by interaction of the machine rotor and stator during insertion, thereby allowing for more straightforward assembly and disassembly of the gas turbine engine, without requiring additional tooling for support of the machine rotor during installation.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 8 is a sectional view of part of the gas turbine engine of FIG. 7.

DETAILED DESCRIPTION

Figure 1:
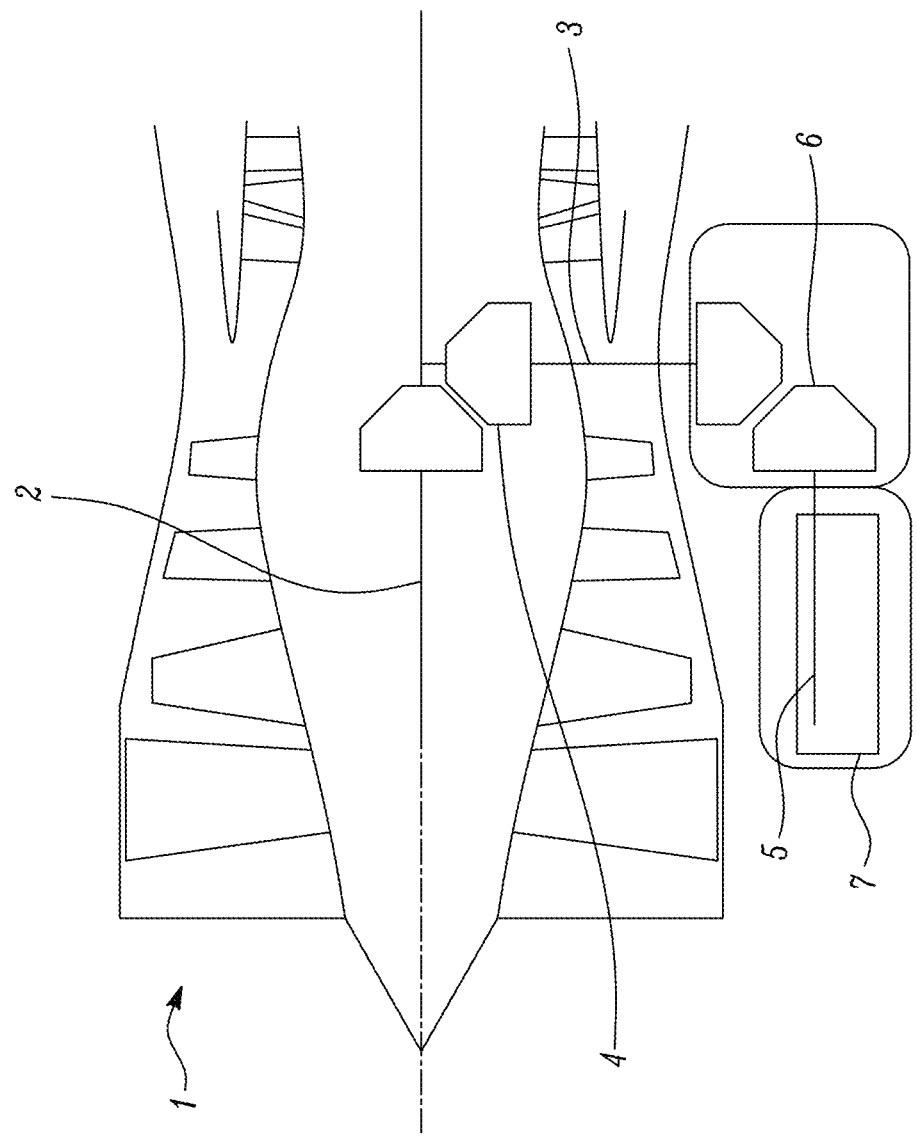
FIG. 1 is a sectional side view of a prior gas turbine engine.
Figure 2:
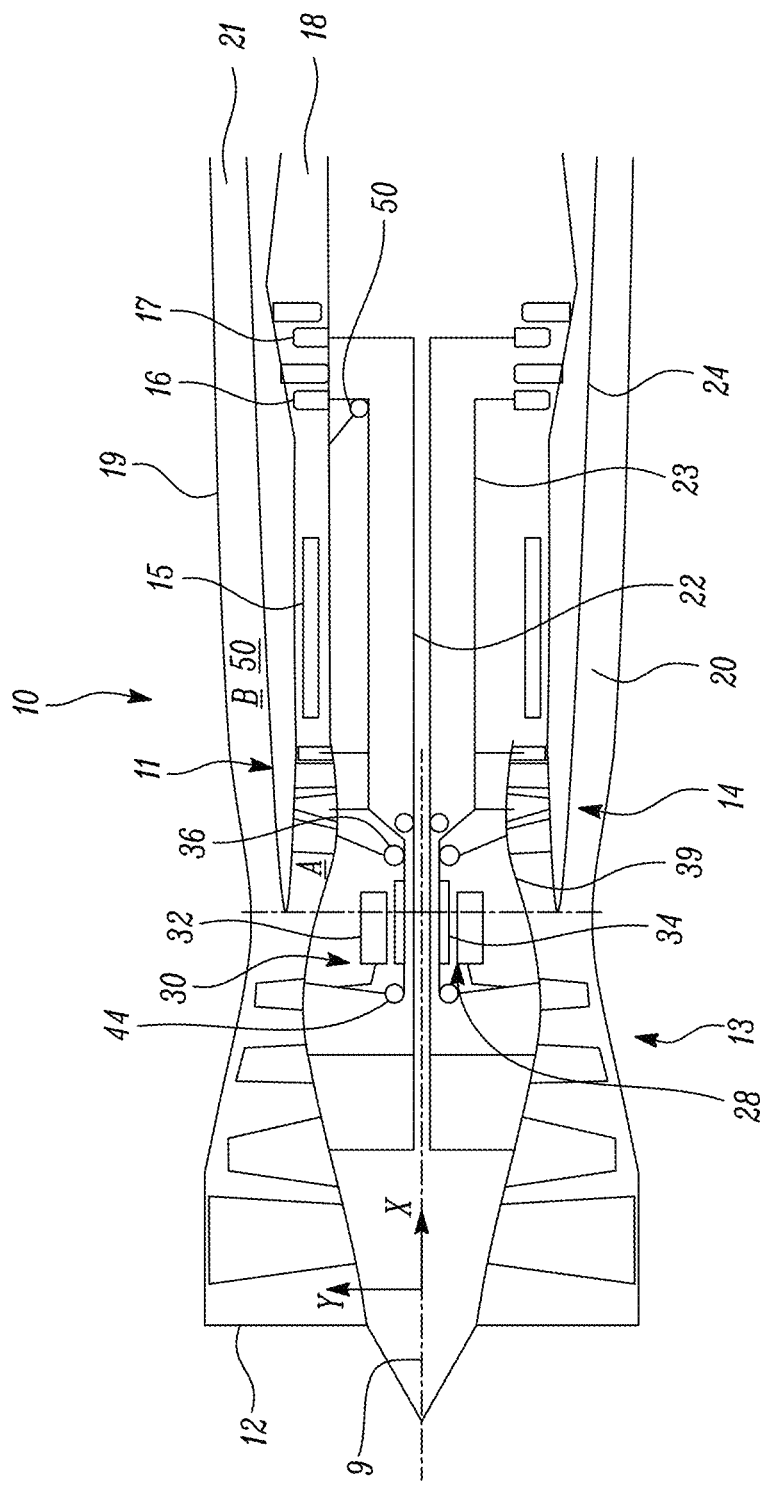
FIG. 2 is a sectional side view of a first gas turbine engine in accordance with the present disclosure.
Figure 3:
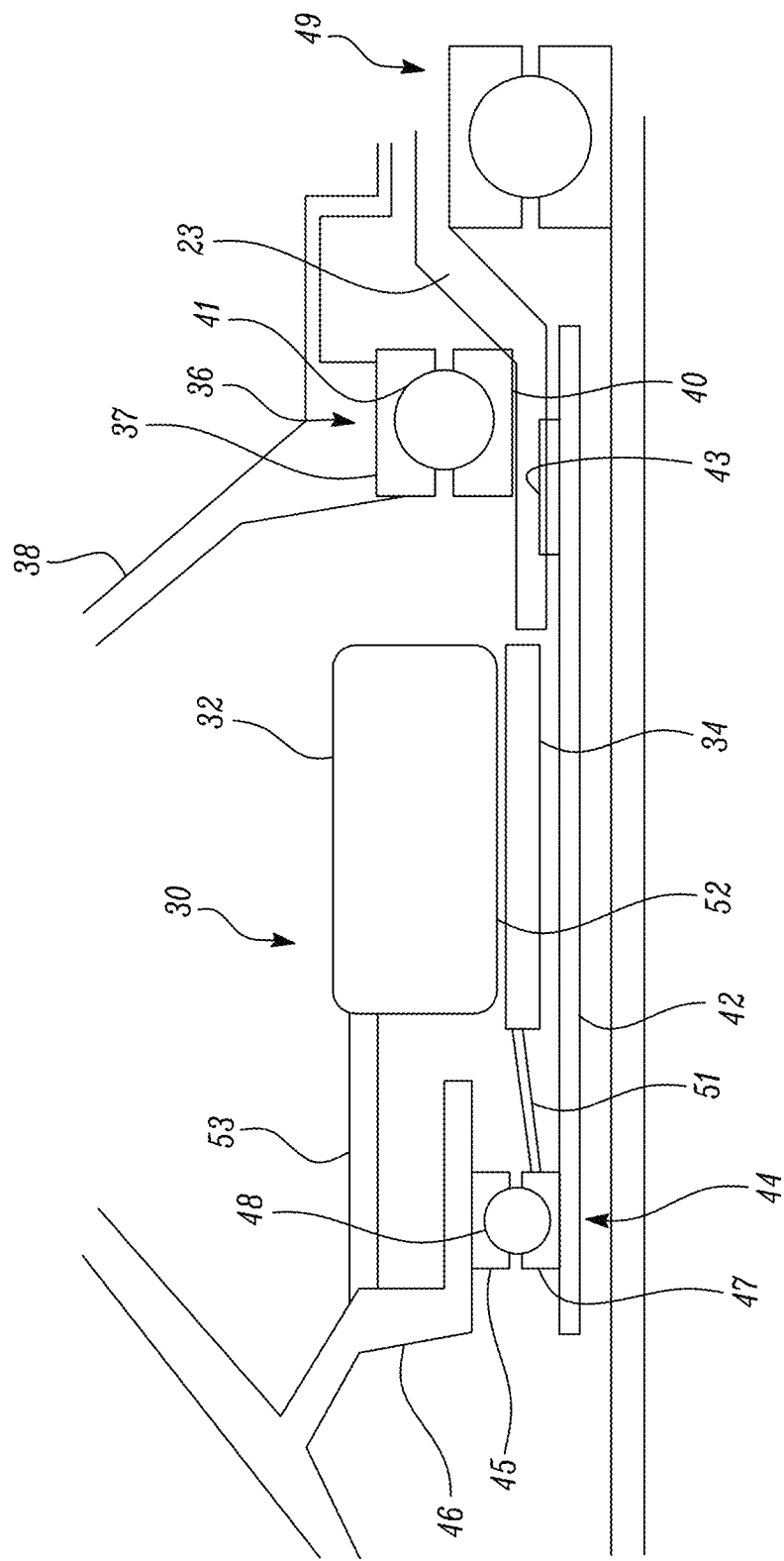
FIG. 3 is a sectional side view of part of the gas turbine engine of FIG. 2.

FIGS. 2 and 3 illustrate a gas turbine engine in the form of a low bypass turbofan 10 having a principal rotational axis 9. The rotational axis 9 defines a rearward direction X generally parallel with airflow through the engine 10, a forward direction opposite the rearward direction, and a radial direction Y. The engine 10 comprises an air intake 12 and a propulsive fan/low pressure compressor 13 that generates two airflows: a core airflow A and a bypass airflow B. The gas turbine engine 10 comprises a core 11 that receives the core airflow A. The engine core 11 comprises, in axial flow series, a high pressure compressor 14, combustion equipment 15, a high-pressure turbine 16, a low pressure turbine 17 and a core exhaust nozzle 18. A nacelle 19 surrounds the gas turbine engine 10 and defines a bypass duct 20 and a bypass exhaust nozzle 21. The bypass airflow B flows through the bypass duct 50, which is bounded by a radially inner wall in the form of a core nacelle 24. The fan 13 is attached to and driven by the low pressure turbine 17 via a low pressure shaft 22. The high pressure compressor 14 is coupled to the high pressure turbine 16 by a high pressure shaft 23 (which is an example of a radially outer portion).

In use, the core airflow A is accelerated and compressed by the high pressure compressor 14 and directed into the combustion equipment 15 where it is mixed with fuel and the mixture is combusted. The resultant hot combustion products then expand through, and thereby drive, the high pressure and low pressure turbines 16, 17 before being exhausted through the nozzle 18 to provide some propulsive thrust.

The high pressure turbine 16 drives the high pressure compressor 14 by a high pressure shaft 23. The fan 13 is in the form of a high pressure, low bypass ratio, multi-stage fan, and provides somewhat less than half the thrust, with the remainder being generated by the core exhaust. In view of the high pressure ratio of the fan 13, the fan 13 can be regarded as a further, low pressure compressor.

The engine 10 can be divided into one or more "spools". Each spool comprises a plurality of rotating components, which rotate together in unison, at the same speed. For instance, in the present disclosure, two spools are provided—a high pressure spool and a low pressure spool. The high pressure spool comprises at least the high pressure compressor 14, high pressure turbine 16, and interconnecting high pressure shaft 23, along with other components that rotate with these components about the main engine axis 9. Similarly, the low pressure spool comprises at least the low pressure compressor/fan 13, low pressure turbine 17, and interconnecting low pressure shaft 22, along with other components that rotate with these components about the main engine axis 9.

The gas turbine engine 10 comprises an electric machine arrangement, which is configured to produce electrical power, and/or provide motive power to start the engine. In some cases, the electric machine may be configured to operate during engine running, to augment engine power, or to improve operation of the compressor 14. The electric machine arrangement comprises a starter generator 30, which comprises an electric machine stator 32 and an electric machine rotor 34. The electric machine rotor 34 is coupled to the high pressure shaft 23, while the stator 32 is coupled to static structure. The electric machine 30 is provided forward of the high pressure compressor 14, and rearward of the low pressure compressor/fan 13, in an annular space provided within the core of the engine, radially inward of the core gas flow path.

Referring now to FIGS. 2 and 3, the high pressure shaft 23 is rotatably supported relative to engine static structure by a main bearing system. The main bearing system comprises a first bearing 36, which supports a central portion of the high pressure shaft 23. The first bearing 36 is located forward of the high pressure compressor 14, and rearward from the electric machine stator 32 and rotor 34. The bearing 36 is in the form of a thrust load roller bearing, which is configured to react both axial and radial loads in use, to allow the high pressure shaft 23 to rotate about the central axis 19. The first bearing 36 comprises a radially outer race 37 which is mounted to a static component such as a radially extending mount arm 38, which extends from an engine core housing 39. The bearing 36 further comprises a radially inner race 40, which is mounted to the high pressure shaft 23. A plurality of rollers 41 are provided therebetween, to allow for rotational movement of the shaft 23.

The high pressure shaft 23 may comprise multiple parts, and in this case, includes a lay shaft 42 (which is an example of a radially inner portion) which extends forward of the first bearing 36, and is joined to the remainder of the shaft 23 by a spline 43. The lay shaft 42 is supported at a forward end by a second bearing 44.

The second bearing 44 is similar to the first bearing 36, and supports a forward end of the shaft 23 via the lay shaft 43. The second bearing 44 is located rearward of the low pressure compressor/fan 13, and forward of the stator 32 and rotor 34 of the electric machine 30. The second bearing 44 is in the form of a thrust bearing configured to react both radial and axial loads in use. Again, the second bearing 44 comprises a radially outer race 45 which is mounted to a static component such as a radially extending mount arm 46, which extends from an engine core housing 39. The bearing 36 further comprises a radially inner race 47, which is mounted to the lay shaft 42 of the high pressure shaft 23. A plurality of rollers 48 are provided therebetween, to allow for rotational movement of the shaft 23.

A third bearing in the form of an inter-shaft bearing 49 is also provided. The inter-shaft bearing 49 extends between the high pressure and low pressure shafts 23, 22, to support the low pressure shaft 22, and to maintain a spacing between the low and high pressure shafts 22, 23. Again, the inter-shaft bearing 49 is in the form of a roller thrust bearing.

A fourth bearing in the form of a further roller bearing 50 is provided at a rear of the engine (see FIG. 2), which supports a rear end of the high pressure shaft 23 relative to static structure. Further bearings (not shown) may be provided.

Referring again to FIG. 3, the rotor 34 of the electric machine is mounted to the lay shaft 42 section of the high pressure shaft 23 via a mount arm 51. The lay shaft section 42 and mount arm 51 are co-axial, with the mount arm 51 having a larger diameter than the lay shaft 42, and being provided radially outwardly of the lay shaft 42 to define an annular space in between the rotor 34 and lay shaft 42. Since the main part of the high pressure shaft 23, the lay shaft 42, and the mount arm 51 all rotate together about the longitudinal axis 9, these can all be said to constitute the high pressure shaft 23. In view of the space provided between the lay shaft 42 and rotor 34, improved cooling can be provided to the electric machine rotor 34, either by air cooling, or by providing an oil jet (not shown) in this location. It will be understood that the high pressure shaft 23 could alternatively comprise a single piece, with the machine rotor 34 being mounted directly to an external surface of the shaft 23. There are multiple advantages associated with providing the rotor 34 on a separate mount arm. For example, provision may be made for an oil jet and oil scavenging (not shown) to impinge on a radially inner side of the mount arm 51 or rotor 34, in view of the gas between the main engine shaft 23 and the electric machine rotor 34. Consequently, improve cooling can be provided.

Furthermore, as can be seen from FIG. 3, the rotor 34 is joined to the shaft at a first axial end, and is disconnected at the other end, such that the rotor has a free-floating axial end and a fixed axial end. Consequently, the rotor 34 is free to move slightly relative to both the main engine, and the stator.

The mount arm 51 is typically fusible, i.e. is configured to break in the event that a stress greater than a predetermined amount is encountered. For example, the mount arm 51 may comprise a thinned portion (not shown), which breaks in the event of a shear stress greater than a predetermined amount. Consequently, in the event of a fault with the electric motor, such as seizing of the rotor 34 relative to the stator 32, the gas turbine engine can continue to operate.

The stator 32 of the electric machine 30 is mounted to a static component such as the mount arm 46, via a further axially extending stator mount arm 53. The stator mount arm 53 is designed to be sufficiently stiff to react loads caused by interaction of the stator 32 and rotor 34 in use. However, some flexibility may be required of the mount arm 53. Typically, the stator mounting is less stiff than the rotor mounting. This ensures that, in the event of a dynamic interaction, the rotor itself does not add additional energy to the system, which may result in increased vibration or movement. In order to increase flexibility, the stator 32 is cantilevered, i.e. is supported at one end only (in this embodiment, the forward end), with the other end being free, to allow for some radial and angular flexing in use. The stator 32 does not include any bearings extending directly between the rotor and stator 32.

The machine 30 is in the form of a permanent magnet, radial flux electric machine. The rotor 34 comprises a plurality of permanent magnets (not shown), which are attached to a radially outer surface of the rotor 34. It will be understood however that the permanent magnet rotor could be replaced by another suitable type, such as an inductance or switched reluctance rotor. Each stator 32 comprises a plurality of electric windings 37 which can be energised with electrical current to enable the machine to act as a motor, or will be energised by interaction with the rotating magnetic field of the rotor 34 to act as a generator.

The rotor 34 is separated from the stator 32 by an airgap 52. As can be seen, no further bearings are provided between the stator 32 and rotor 34, and so the rotor 34 is mounted separately to the stator 32, via the main engine bearings 36, 44, 49, 50, with at least one bearing 36, 44 being provided either side. Consequently, the airgap 52 is defined by the main engine bearings 36, 44, 49, 50. As can be appreciated from FIG. 3, loads from the rotor 34 are carried through the main bearings 36, 44, 49, 50, rather than through the stator 32, which is mounted separately since there is no direct mounting of the rotor to the stator. Consequently, the rotor 34 can be removed and installed separately to the stator 32, without having to disturb the stator 32, as described below, and with reference to FIG. 4.

In a first step, the low pressure shaft 22 is removed from the engine, by unbolting the shaft, and pulling it axially either rearward or forward. In a second step, the high pressure shaft 23 is similarly unbolted, and pulled either forward or rearward. In the described embodiment, the high pressure shaft 23 is pulled rearward to remove it.

Figure 4:
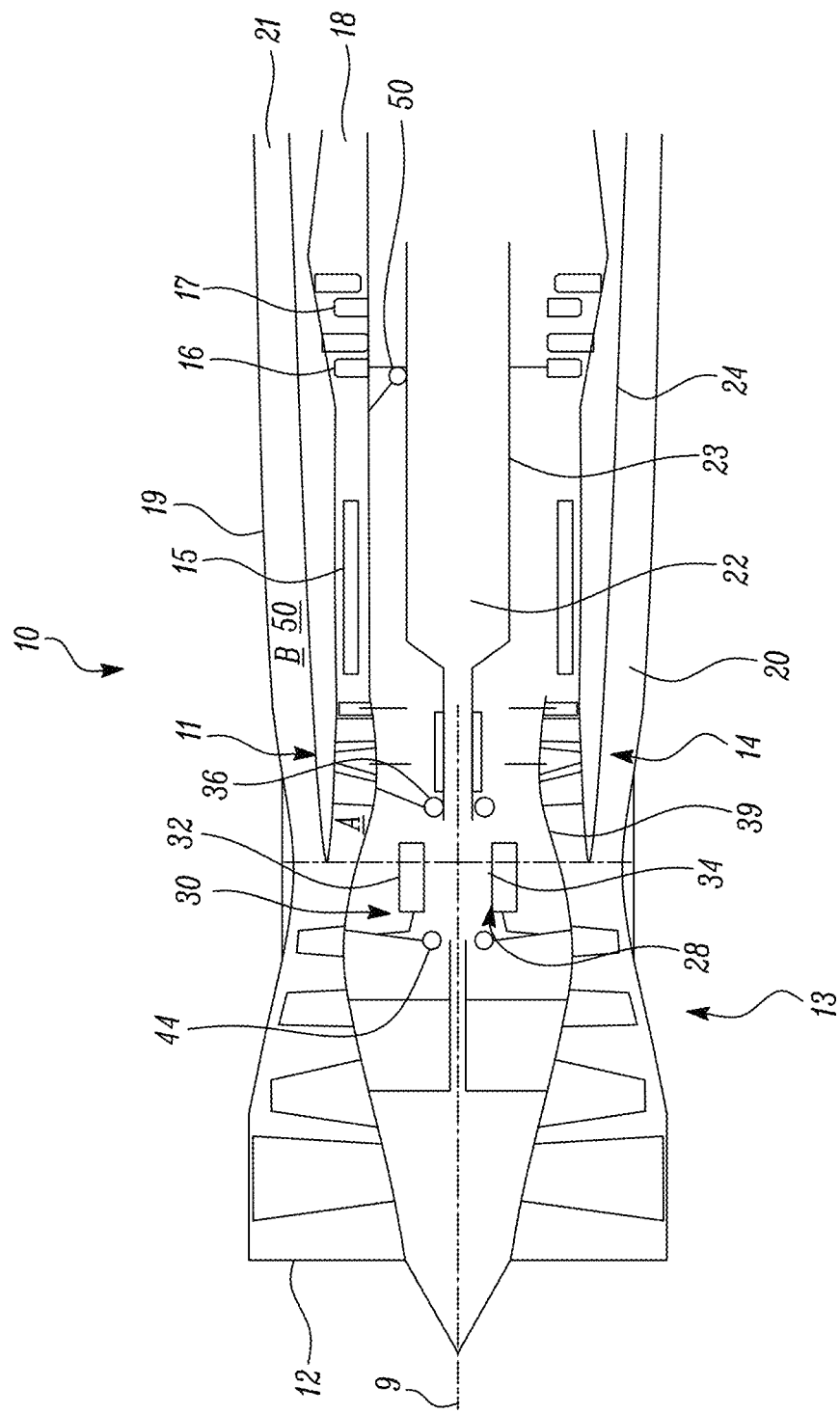
FIG. 4 is a section side of the gas turbine engine of FIG. 2, partially disassembled.

FIG. 4 shows the engine with the low pressure shaft 22 already removed, and the high pressure shaft 23 already unbolted and moved partially rearward. As can be seen, during removal, the shaft 23 including the electric machine rotor 34 is supported by at least some of the main shaft bearings 36, 44, 50, at least until the rotor 34 is clear of the stator 32. Consequently, the air gap 52 between the rotor 34 and stator 32 is maintained, which avoids damage to either the rotor 34 or stator 32. Where the electric machine comprises a permanent magnet electric machine, the permanent magnets of the rotor 34 would normally cause radial forces, which would have to be reacted during removal of the shaft. By supporting the rotor 34 on the main engine bearings 36, 44, 50, the rotor 34 is prevented from moving radially during removal, making removal more straightforward, and avoiding the need for separate tooling during assembly and disassembly.

Once the high pressure shaft 23 and machine rotor 34 are removed, the stator 32 may then be removed, either in part or as a whole. One option may be to disassemble the stator 32 in place, and for this purpose, the stator 32 may be circumferentially segmented.

Figure 5:
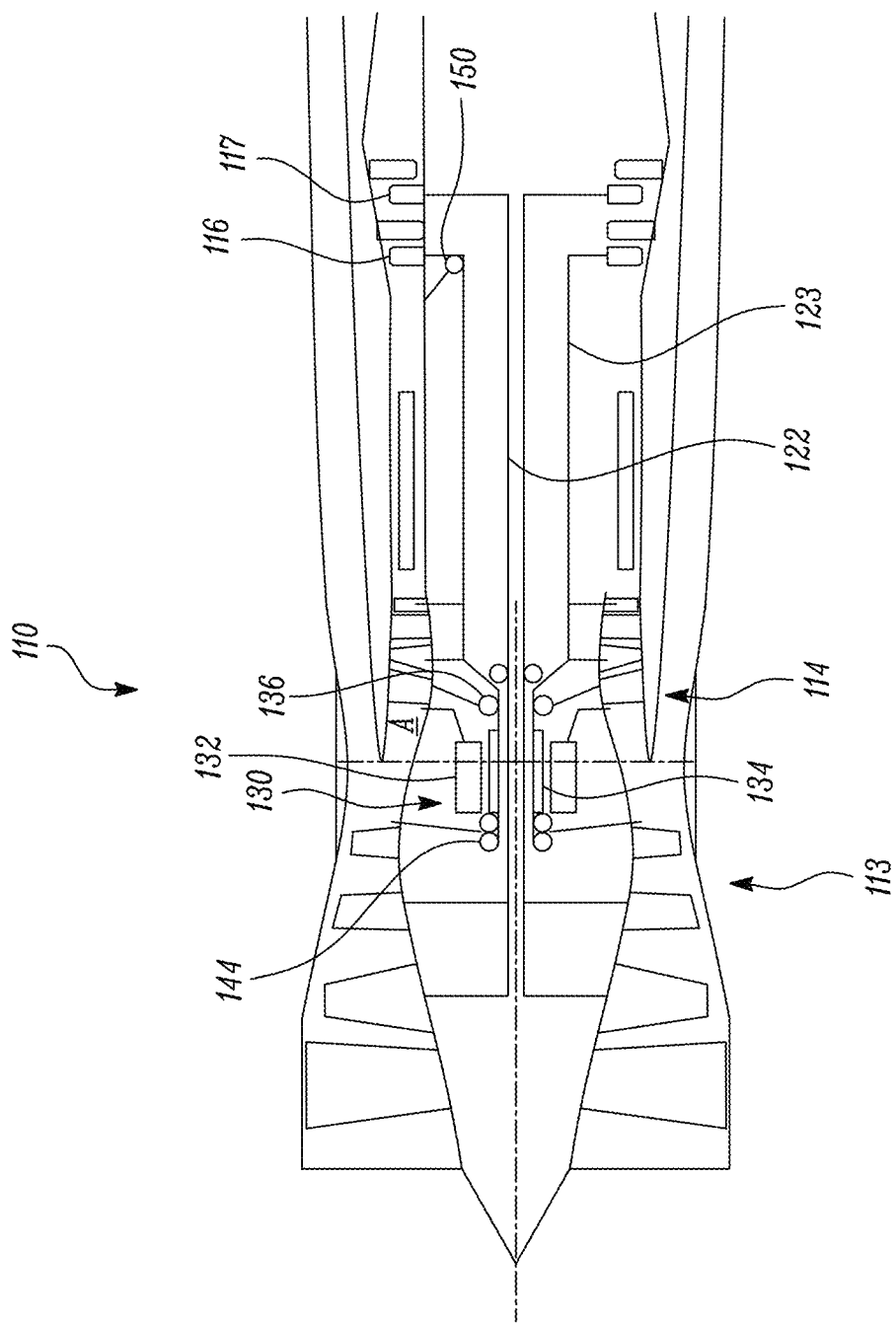
FIG. 5 is a sectional side view of a second gas turbine engine in accordance with the present disclosure.

FIG. 5 shows a second gas turbine engine 110, which is similar to the engine 10, and so only differences therebetween will be described in detail.

The engine 110 has an architecture similar to the engine 10, having two spools, a high pressure spool and a low pressure spool, each comprising respective compressors 114, 113, turbines 116, 117, and shafts 123, 122. The engine 110 also comprises an electric machine 130 comprising a stator 132 and rotor 134.

However, the high pressure shaft 123 and electric machine stator 132 and rotor 134 are mounted differently to their equivalents 23, 30 of the first embodiment.

The high pressure shaft 123 is mounted to a bearing arrangement comprising first, second, third and further bearings 136, 144, 149, 150. The first, third and further bearings 144, 149, 150 are similar to the first bearing 44 of the first embodiment. However, the second bearing 144 is in the form of a double-row bearing or "back-to-back" bearing 144.

Figure 6:
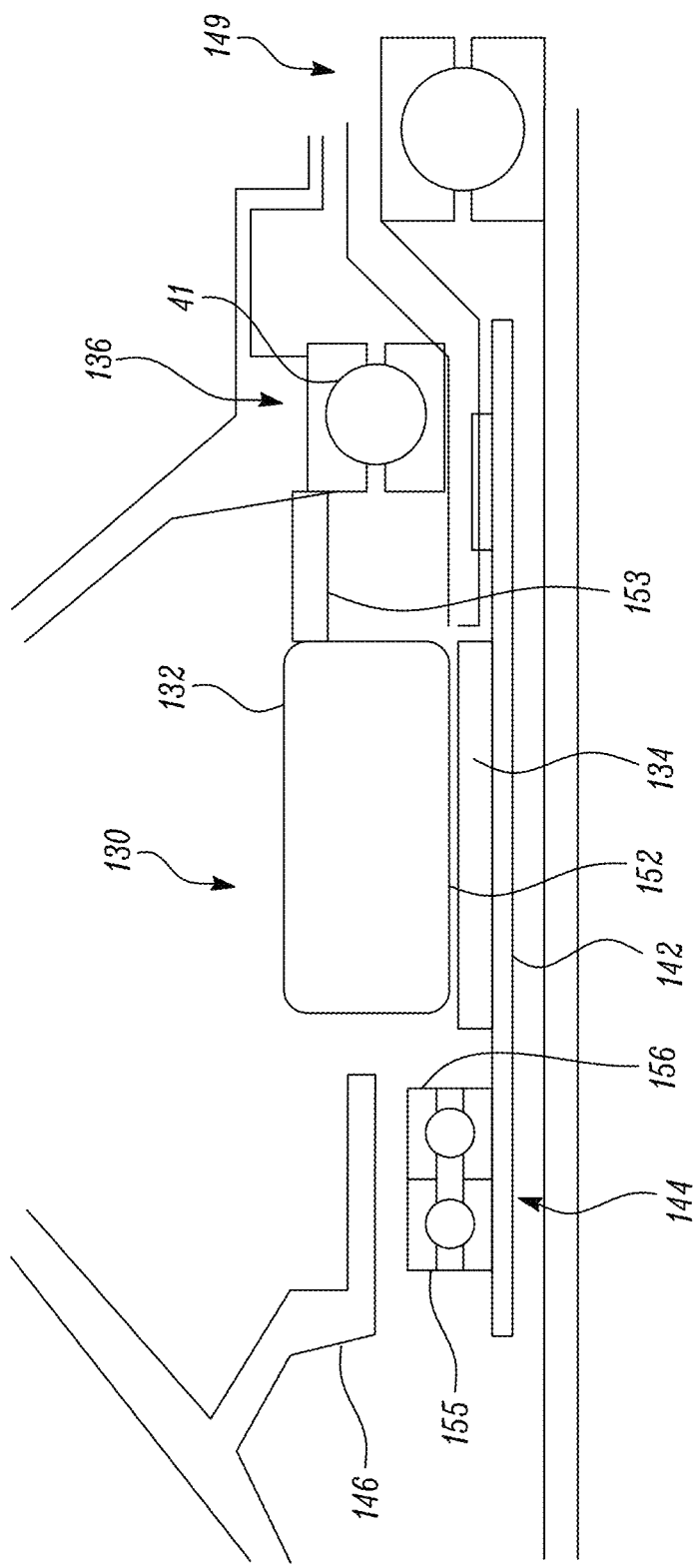
FIG. 6 is a sectional side view of part of the gas turbine engine of FIG. 5.

Referring to FIG. 6, the double row bearing is provided in the same location as the second bearing 144 of the first embodiment, i.e. rearward of the low pressure compressor 113, and forward of the electric machine stator 132 and rotor 134, and is arranged to support a forward end of a lay shaft 142 of the high pressure shaft 123 relative to static structure 146. The second bearing 144 comprises a forward bearing 155 and a rearward bearing 156, the races of which contact one another. The forward and rearward bearings are arranged with their contact angles diverging radially inwardly. Consequently, the bearing 144 is self-centring, and any reversals of axial loads (such as where the engine decelerates in flight), do not result in skidding of the bearings.

Similarly, the stator mounting arrangement is different in this embodiment. The stator 132 is again mounted with a cantilevered arrangement, being supported only at one end. However, in this embodiment, the stator 132 is mounted by a stator mount arm 153, which extends forward from static structure provided forward of the stator 132. Again, some degree of flexibility is provided to enable the stator to absorb movement in use.

The machine rotor 134 is also mounted differently. Instead of being mounted to a separate rotor mount arm 51, the rotor 134 is mounted directly to the lay shaft 142. Though this design may result in reduced cooling capacity, the overall system may be lighter and more compact in view of the reduction in parts.

Figure 7:
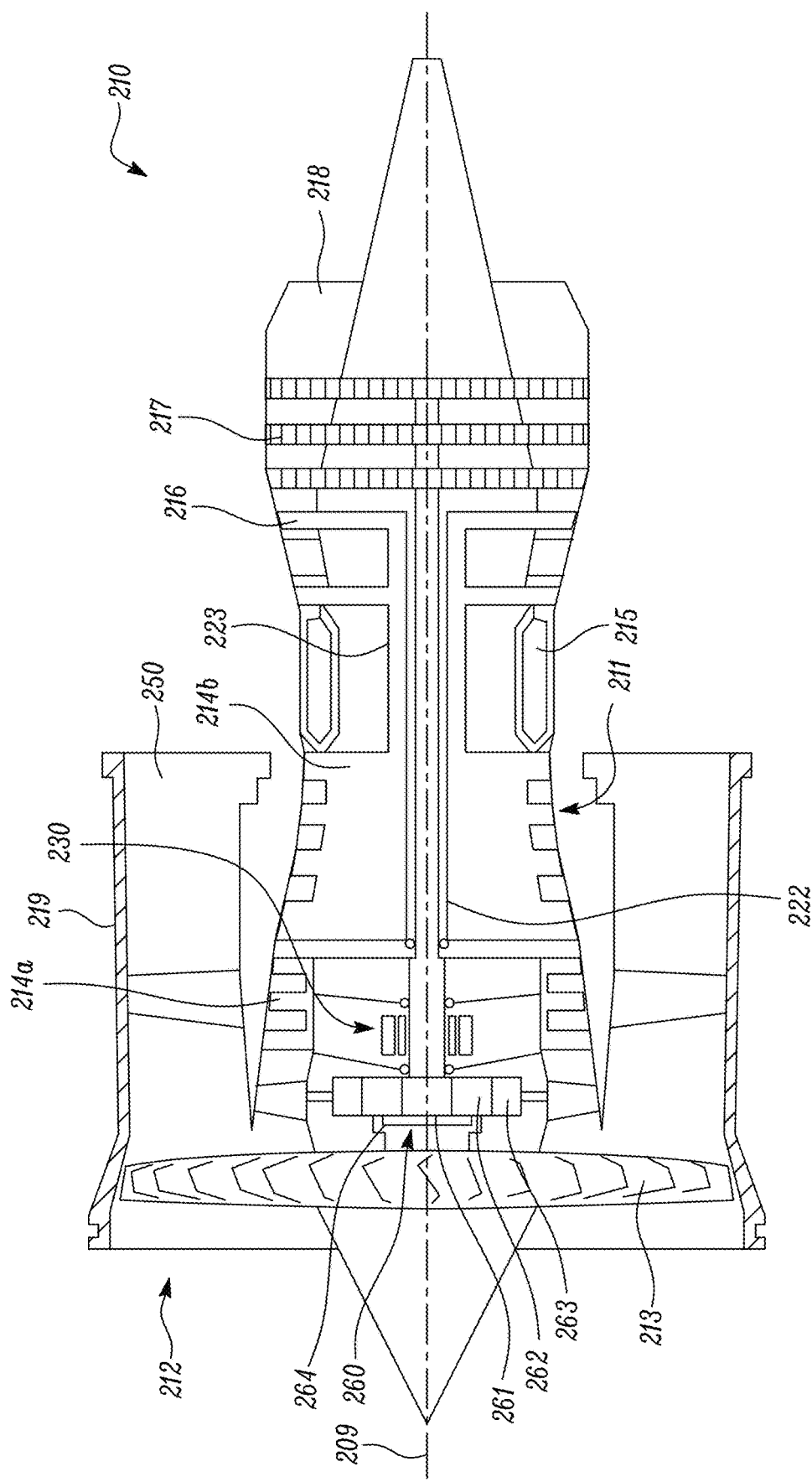
FIG. 7 is a sectional side view of a third gas turbine engine in accordance with the present disclosure.

FIG. 7 shows a third gas turbine engine 210 in the form of a geared, high bypass ratio gas turbine engine 210. The engine 210 comprises an air intake 212 and a propulsive fan 213 that generates two airflows: a core airflow A and a bypass airflow B. The fan 213 differs from the fan 13, in that only a single, low pressure stage is provided. However the fan 213 has a much larger diameter compared to the core 211, and so defines a high bypass ratio. The gas turbine engine 210 comprises a core 211 that receives the core airflow A. The engine core 211 comprises, in axial flow series, a low pressure compressor 214a, a high pressure compressor 214b, combustion equipment 215, a high-pressure turbine 216, a low pressure turbine 217 and a core exhaust nozzle 218. A nacelle 219 surrounds the gas turbine engine 210 and defines a bypass duct 250. The bypass airflow B flows through the bypass duct 250, which is bounded by a radially inner wall in the form of a core nacelle 224. The fan 213 is attached to and driven by the low pressure turbine 217 via a low pressure shaft 222 and reduction gearbox 260. The low pressure turbine also drives the low pressure compressor 214a. The high pressure compressor 214b is coupled to the high pressure turbine 216 by a high pressure shaft 223. The shafts 222, 223 rotate about a longitudinal axis 219. Together, the high pressure turbine, shaft and compressor 216, 214b, 223 form a high pressure spool, and the low pressure turbine 217, shaft 222, compressor 214a, gearbox 260 and fan 213 together form a low pressure spool.

Referring now to FIG. 8 in conjunction with FIG. 7, the low pressure turbine 217 drives the low pressure shaft 222, which is coupled to a sun gear 261 of the gearbox 260. The sun gear meshes with a plurality of planet gears 262, which in turn mesh with a ring gear 263. The planet gears are mounted to a planet carrier 264, which is in turn mounted to the fan 213 to thereby turn the fan at a reduced speed compared to the low pressure turbine 217.

The gas turbine engine 210 additionally comprises an electric machine arrangement, which is configured to produce electrical power, and/or provide motive power to start the engine. The electric machine arrangement is similar to the arrangement of the first embodiment, and again comprises starter generator 230, which comprises an electric machine stator 232 and an electric machine rotor 234. The electric machine differs from the previous embodiment, in that the electric machine rotor 234 is coupled to the low pressure shaft 222 in this example, on the input side of the gearbox 260. The electric machine arrangement also differs from the first embodiment, in that the stator 232 and rotor 234 are provided in a space within the core 211 axially between the low pressure compressor 214a and the gearbox 240.

Again, the stator 232 is mounted to static structure in the form of a mount arm 246 via an axially, rearward extending stator mount arm 253. The rotor 234 is directly mounted to the low pressure shaft 222, and is supported by a main bearing system, which supports the low pressure shaft 222 and maintains an air gap 252 between the rotor 234 and stator 232.

The main shaft bearing system comprises a first bearing in the form of a roller bearing 236, which is similar to the bearing 36 of the first embodiment, though the bearing 236 supports the low pressure shaft relative to static structure, rather than supporting the high pressure shaft. The first bearing 236 is provided forward of the rotor 234 and stator 232, and is provided rearward of the gearbox 260.

A second low pressure shaft bearing 244 is provided, which supports the low pressure shaft 222 relative to static structure. The second bearing 244 also comprises a roller bearing, and is provided rearward of the stator 232 and rotor 234, and forward of the high pressure compressor 214b. Further main engine shaft bearings may be provided, such as rear bearings, high pressure shaft bearings, and inter-shaft bearings, as well as thrust bearings and gearbox bearings.

Again, the rotor 234 is supported only by the main engine shaft bearings, and no additional bearings are provided between the rotor 234 and stator 232 to maintain the air gap 252. Consequently, rotor loads are transmitted to the static structure separately to stator loads.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 4 has a split flow nozzle meaning that the flow through the bypass duct has its own nozzle that is separate to and radially outside the core engine nozzle 218. However, this is not limiting, and any aspect of the present disclosure may also apply to engines in which the flow through the bypass duct and the flow through the core are mixed, or combined, before (or upstream of) a single nozzle, which may be referred to as a mixed flow nozzle. One or both nozzles (whether mixed or split flow) may have a fixed or variable area.

Similarly, features of the different embodiments could be combined. For instance, the stator mounting arrangement of FIG. 6 could be used in the gas turbine of FIG. 7. The electric machine of FIG. 7 could be provided between the high and low pressure compressors. The double row bearings of FIG. 6 could be replaced by the single row bearings of FIGS. 2 to 4, and vice versa. The geared engine of FIG. 7 could comprise a direct drive fan similar to that of FIGS. 2 to 6, with the low pressure shaft driving both the low pressure compressor and fan, or separate shafts driving the low pressure compressor and fan independently, in a three-shaft configuration.

Similarly, different types of bearings could be provided. For instance, one or more electromagnetic, pneumatic or hydraulic bearings could replace one or more roller bearings.

Different types of electric machines could be used. For example, hybrid axial/radial flux machines could be used. The stator could be provided radially inward of the rotor. The permanent magnet machine could be replaced with any of a wound field machine, an induction machine, and a switched reluctance machine. The machines could be coupled to the high pressure shaft, or could be coupled to the low pressure shaft after the gearbox (i.e. at the output side of the gearbox, where the speed is reduced).

In a further embodiment, a plurality of electric machines could be provided. A first electric machine may be coupled to a first shaft, such as a high pressure shaft, and a second electric machine may be coupled to a second shaft, such as a low pressure shaft. One of the machines may be configured to be used as a starter, with the other being configured to be used as a generator, or both may have both functions. In such a case, the electric machines may be utilised to transfer power from one main engine shaft to another.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An aircraft gas turbine engine comprising:
a main engine shaft;
a main engine shaft bearing arrangement configured to rotatably support the main engine shaft; and
an electric machine comprising a rotor and a stator; wherein:
the rotor is mounted to the main engine shaft and is rotatably supported by the main engine shaft bearing arrangement,
the stator is cantilevered from a static structure of the gas turbine engine and the stator is supported at a first end only with a second end opposite the first end being free to allow for radial and angular flexing in use,
the stator is positioned radially outward of the rotor,
the main shaft bearing arrangement comprises first and second bearings arranged to support the rotor, the first bearing being provided axially rearward of the rotor and the second bearing being provided axially forward of the rotor, and the main engine shaft comprises a radially inner portion and a radially outer portion separated by an annular space, and joined at one end.

2. The gas turbine engine according to claim 1, wherein the rotor is mounted to the main engine shaft such that the rotor axially moves with the main engine shaft when the main engine shaft is moved axially and such that the rotor does not axially overlap the stator.

3. The gas turbine engine according to claim 1, wherein the rotor and the main engine shaft are supported by the static structure via a common bearing.

4. The gas turbine engine according to claim 1, wherein the stator is mounted by a mount member extending generally rearward or generally forward from a gas turbine engine static structure.

5. The gas turbine engine according to claim 1, wherein the rotor is mounted to the radially outer portion of the main engine shaft.

6. The gas turbine engine according to claim 5, wherein the radially inner and radially outer portions are joined by a fusible connector.

7. The gas turbine engine according to claim 1, wherein the electric machine comprises an electric motor configured to provide motive power to start the gas turbine engine in a starting mode, and comprises a generator configured to generate electrical power when in a running mode.

8. The gas turbine engine according to claim 1, wherein the electric machine comprises a radial flux electric machine.

9. The gas turbine engine according to claim 1, wherein the electric machine comprises a permanent magnet electric machine.

10. The gas turbine engine according to claim 1, wherein the gas turbine engine comprises a low pressure compressor located axially forwardly of a high pressure compressor, and the electric machine is located axially between the low pressure compressor and the high pressure compressor.

11. A method of assembling an embedded electric machine in a gas turbine engine, the method comprising:
mounting a stator of the electric machine to a static structure of the gas turbine engine; and
then inserting a gas turbine engine main shaft comprising an electric machine rotor into an annular space defined by the stator; the gas turbine engine main shaft being supported by a main shaft bearing arrangement,
wherein the stator is cantilevered from the static structure and the stator is supported at a first end only with a second end opposite the first end being free to allow for radial and angular flexing in use, the stator is positioned radially outward of the rotor, and the main shaft bearing arrangement comprises first and second bearings arranged to support the rotor, the first bearing being provided axially rearward of the rotor and the second bearing being provided axially forward of the rotor and the main shaft comprises a radially inner portion and a radially outer portion separated by an annular space, and joined at one end.

* * * * *